United States Patent
Iyer

(10) Patent No.: US 11,499,736 B2
(45) Date of Patent: Nov. 15, 2022

(54) HVAC EQUIPMENT SETTINGS

(71) Applicant: Carrier Corporation, Palm Beach Gardens, FL (US)

(72) Inventor: Siva S. Iyer, Carmel, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 19 days.

(21) Appl. No.: 16/270,092

(22) Filed: Feb. 7, 2019

(65) Prior Publication Data
US 2019/0249896 A1   Aug. 15, 2019

Related U.S. Application Data

(60) Provisional application No. 62/628,516, filed on Feb. 9, 2018.

(51) Int. Cl.
| | | |
|---|---|---|
| *F24F 11/49* | (2018.01) | |
| *F24F 11/52* | (2018.01) | |
| *F24F 11/58* | (2018.01) | |
| *F24F 11/89* | (2018.01) | |
| *G05D 23/19* | (2006.01) | |
| *G05B 15/02* | (2006.01) | |
| *F24F 11/65* | (2018.01) | |
| *G06F 21/30* | (2013.01) | |
| *F24F 140/00* | (2018.01) | |

(52) U.S. Cl.
CPC .............. *F24F 11/49* (2018.01); *F24F 11/52* (2018.01); *F24F 11/58* (2018.01); *F24F 11/65* (2018.01); *F24F 11/89* (2018.01); *G05B 15/02* (2013.01); *G05D 23/1917* (2013.01); *G06F 21/30* (2013.01); *F24F 2140/00* (2018.01);

(58) Field of Classification Search
None
See application file for complete search history.

(56) References Cited

U.S. PATENT DOCUMENTS

| | | |
|---|---|---|
| 741,023 A | 10/1903 | Filbey |
| 7,188,002 B2 | 3/2007 | Chapman, Jr. et al. |
| 7,212,887 B2 | 5/2007 | Shah et al. |
| 7,296,426 B2 | 11/2007 | Butler et al. |
| 7,383,158 B2 | 6/2008 | Krocker et al. |
| 7,744,008 B2 | 6/2010 | Chapman, Jr. et al. |
| 7,775,452 B2 | 8/2010 | Shah et al. |
| 8,167,216 B2 | 5/2012 | Schultz et al. |
| 9,551,504 B2 | 1/2017 | Arensmeir et al. |
| 9,642,022 B2 | 5/2017 | Hill et al. |
| 9,678,518 B2 | 6/2017 | Boesveld et al. |
| 9,684,317 B2 | 6/2017 | Fadell et al. |
| 9,703,287 B2 | 7/2017 | Arensmeier |
| 9,746,859 B2 | 8/2017 | Conner et al. |

(Continued)

*Primary Examiner* — Sean Shechtman
(74) *Attorney, Agent, or Firm* — Cantor Colburn LLP

(57) ABSTRACT

Methods, systems, and computer program products for interfacing with thermostats for heating, ventilation and air-conditioning (HVAC) systems are provided. Aspects include receiving, by a user device, job data comprising a location of a job. The credentialing data is transmitted, by the user device to a server, wherein the credentialing data comprises the location of the job. Also, responsive to transmitting credentialing data, thermostat setup data comprising HVAC system information is received by the user device. The user device connects to a thermostat and transmits the HVAC system information.

15 Claims, 3 Drawing Sheets

(56) References Cited

U.S. PATENT DOCUMENTS

| | | |
|---|---|---|
| 9,823,672 B2 | 11/2017 | Mccurnin et al. |
| 2006/0247826 A1 | 11/2006 | Green et al. |
| 2013/0332306 A1 | 12/2013 | Fahmy et al. |
| 2016/0025366 A1* | 1/2016 | Snow ................. F24F 11/30 700/276 |
| 2016/0036958 A1* | 2/2016 | Logan ................ G05B 15/02 455/414.1 |
| 2016/0040903 A1 | 2/2016 | Emmons et al. |
| 2016/0209062 A1* | 7/2016 | Castillo ............ H04L 12/2836 |
| 2016/0217674 A1 | 7/2016 | Stewart et al. |
| 2017/0146261 A1 | 5/2017 | Rogers et al. |
| 2017/0364106 A1 | 12/2017 | Smith et al. |

* cited by examiner

HVAC EQUIPMENT SETTINGS

CROSS-REFERENCE TO RELATED APPLICATIONS

This application claims the benefit of U.S. Application No. 62/628,516 filed Feb. 9, 2018, which is incorporated herein by reference in its entirety.

BACKGROUND

Exemplary embodiments pertain to the art of heating, ventilation, an air conditioning (HVAC) systems and more particularly to setting up and configuration of HVAC equipment settings.

Heating, ventilation and air conditioning (HVAC) systems are becoming increasingly complex. As an example, such systems typically include an indoor unit, which may be a furnace or heater/fan coil. Also, an outdoor unit that may be an air conditioner or heat pump is provided. Most units include a thermostat. More sophisticated systems may include separate zone controls for several zones, a ventilator, a humidifier, an air cleaner, etc.

To provide efficient system control, an installer must configure a control to know the characteristics of the other units installed in the particular system. As an example, the particular size or capacity of the furnace may impact the control of the ventilator, humidifier, etc. As HVAC systems become even more sophisticated, and perform more advanced functions, the complexity of configuration will only increase.

BRIEF DESCRIPTION

According to one embodiment, a method for interfacing with thermostats for heating, ventilation and air-conditioning (HVAC) systems is provided. The method may include receiving, by a user device, job data including a location of a job. The credentialing data is transmitted, by the user device to a server, wherein the credentialing data comprises the location of the job. Also, responsive to transmitting credentialing data, thermostat setup data comprising HVAC system information is received by the user device. The user device connects to a thermostat and transmits the HVAC system information.

In addition to one or more of the features described above, or as an alternative, further embodiments of the method may include receiving, by the user device from the thermostat, an indication, wherein the indication includes a confirmation of a setup of the thermostat.

In addition to one or more of the features described above, or as an alternative, further embodiments of the method may include that the HVAC system information includes at least one of setup instructions for the thermostat, test instructions for the thermostat, and HVAC model data.

In addition to one or more of the features described above, or as an alternative, further embodiments of the method may include that the credentialing data further includes an input from a user.

In addition to one or more of the features described above, or as an alternative, further embodiments of the method may include that the input from the user comprises a login and password for the user of the user device.

In addition to one or more of the features described above, or as an alternative, further embodiments of the method may include generating a report, by the user device, responsive to receiving a confirmation from the thermostat and transmitting the report to the server.

In addition to one or more of the features described above, or as an alternative, further embodiments of the method may include verifying, by the user device, the setup instructions were executed on the thermostat and transmitting a confirmation to the server based at least in part on the setup instruction being executed.

In addition to one or more of the features described above, or as an alternative, further embodiments of the method may include that the credentialing data further includes thermostat identification data.

According to one embodiment, a system for interfacing with a heating ventilation and air-conditioning (HVAC) system is provided. The system may include a thermostat including thermostat data, and a user device in communication with the thermostat, wherein the user device is configured to: receive job data including a location of a job. Credentialing data is transmitted to a server, wherein the credentialing data includes the job data. Thermostat setup data including HVAC system information is received from the server and transmitted to the thermostat.

In addition to one or more of the features described above, or as an alternative, further embodiments of the thermostat is further configured to transmit an indication to the user device, wherein the indication includes a confirmation of a setup of the thermostat.

In addition to one or more of the features described above, or as an alternative, further embodiments of the system may include that the HVAC system information includes at least one of setup instructions for the thermostat, test instructions for the thermostat, and HVAC model data.

In addition to one or more of the features described above, or as an alternative, further embodiments of the system may include that the credentialing data further includes an input from a user.

In addition to one or more of the features described above, or as an alternative, further embodiments of the system may include that the input from the user comprises a login and password for the user of the user device.

In addition to one or more of the features described above, or as an alternative, further embodiments of the system may include that the user device is further configured to: generate a report responsive to receiving a confirmation from the thermostat and transmit the report to the server.

According to one embodiment, a thermostat is provided. The thermostat may include a housing, a transceiver, and a controller coupled to a memory, the controller configured to control an HVAC system. The controller is further configured to: receive, via the transceiver, HVAC system information. Responsive to receiving the HVAC system information, a setup for the HVAC system is performed based at least in part on the HVAC system information. An indication is transmitted via the transceiver, wherein the indication includes a confirmation of the setup of the HVAC system.

In addition to one or more of the features described above, or as an alternative, further embodiments of the thermostat may include that the HVAC system information includes at least one of setup instructions for the thermostat, test instructions for the thermostat, and HVAC model data.

In addition to one or more of the features described above, or as an alternative, further embodiments of the thermostat may include that the controller is further configured to: generate a report responsive to setting up the HVAC system and transmit the report to the server In addition to one or more of the features described above, or as an alternative, further embodiments of the thermostat may include that the indication is transmitted to a user device.

In addition to one or more of the features described above, or as an alternative, further embodiments of the thermostat may include that the indication is transmitted to a server.

BRIEF DESCRIPTION OF THE DRAWINGS

The following descriptions should not be considered limiting in any way. With reference to the accompanying drawings, like elements are numbered alike.

DETAILED DESCRIPTION

Smart technology devices such as internet of things (IoT) objects have been incorporated in every day systems to connect otherwise electronically isolated objects or devices to either other IoT objects or to the internet. For example, a thermostat controlling an HVAC system can be wired to a local internet connection to communicate with other devices, such as, for example, a smart phone or tablet for a user or an HVAC technician. The term Internet of Things (IoT) object is used herein to refer to any object (e.g., thermostat, etc.) that has an addressable interface (e.g., an Internet protocol (IP) address, a Bluetooth identifier (ID), a near-field communication (NFC) ID, etc.) and can transmit information to one or more other objects over a wired or wireless connection. An IoT object may have a passive communication interface, such as a quick response (QR) code, a radio-frequency identification (RFID) tag, an NFC tag, or the like, or an active communication interface, such as a modem, a transceiver, a transmitter-receiver, or the like. An IoT object can have a particular set of attributes (e.g., a device state or status, such as whether the IoT object is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet.

The methods and systems presented herein according to one or more embodiments provide an HVAC installer or technician with a validated login for setting up a thermostat connected to an HVAC system. The thermostat can be an IoT object as described herein. Using an application on a smart device, the HVAC installer or technician can provide functionality to save precise equipment setup and test procedures that can be wirelessly communicated to a thermostat thereby reducing setup time and errors in installation and testing. Furthermore, after a test is conducted on an installed HVAC system through the thermostat, test results can be communicated from the application to a cloud database for audit, analysis, and error detection.

Figure 1:
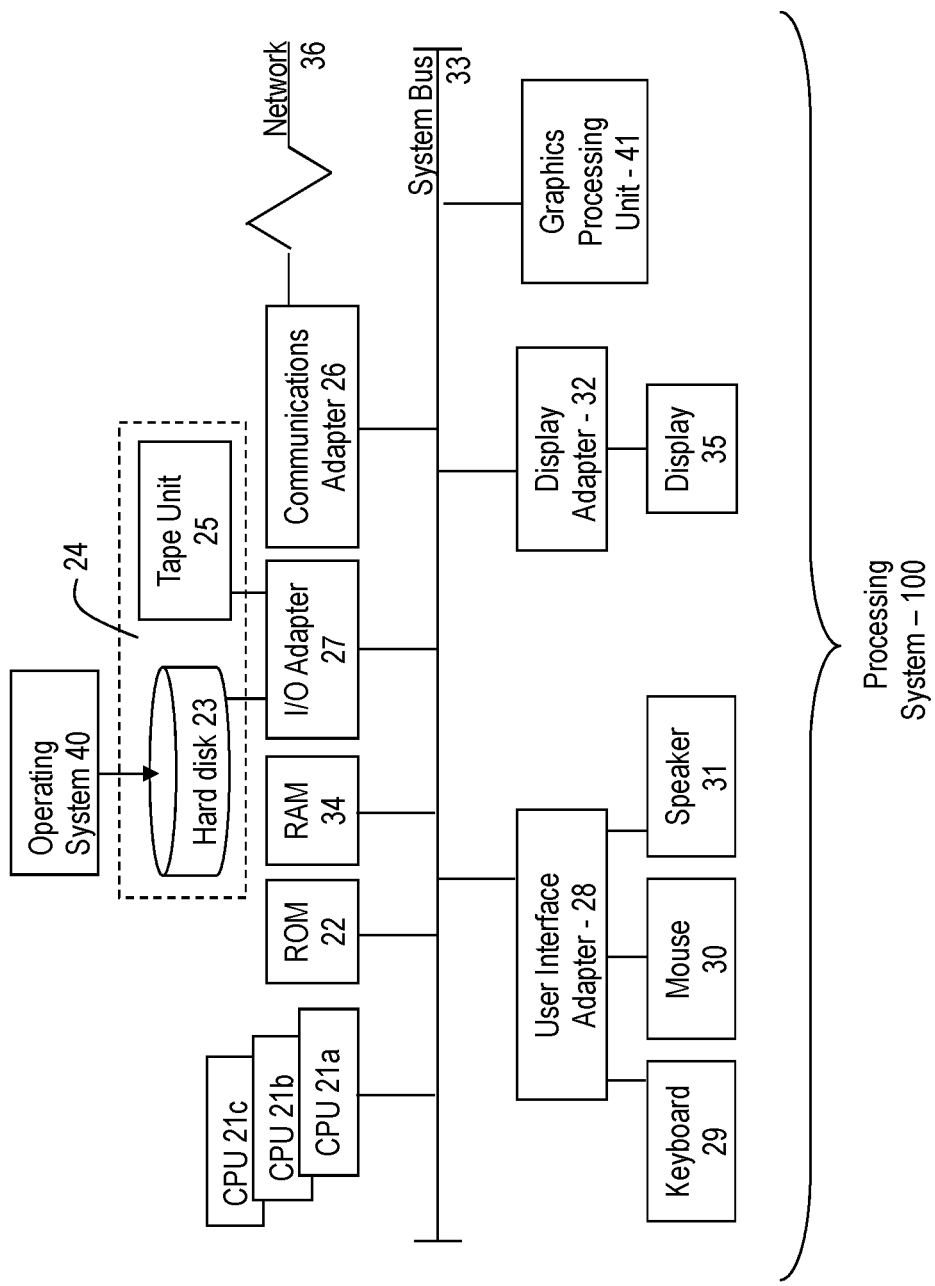
FIG. 1 depicts a block diagram of a computer system for use in implementing one or more embodiments of the disclosure.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 200 may be stored in mass storage 24. A network adapter 26 interconnects bus 33 with an outside network 36 enabling data processing system 100 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 100 described herein is merely exemplary and not intended to limit the application, uses, and/or technical scope of the present disclosure, which can be embodied in various forms known in the art.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1. FIG. 1 is merely a non-limiting example presented for illustrative and explanatory purposes. In one or more embodiments, any embedded computing platform can be utilized.

The computing systems 100 may be used to execute or perform embodiments and/or processes described herein, such as within and/or on a smart device and/or thermostat controlling an HVAC system.

Figure 2:
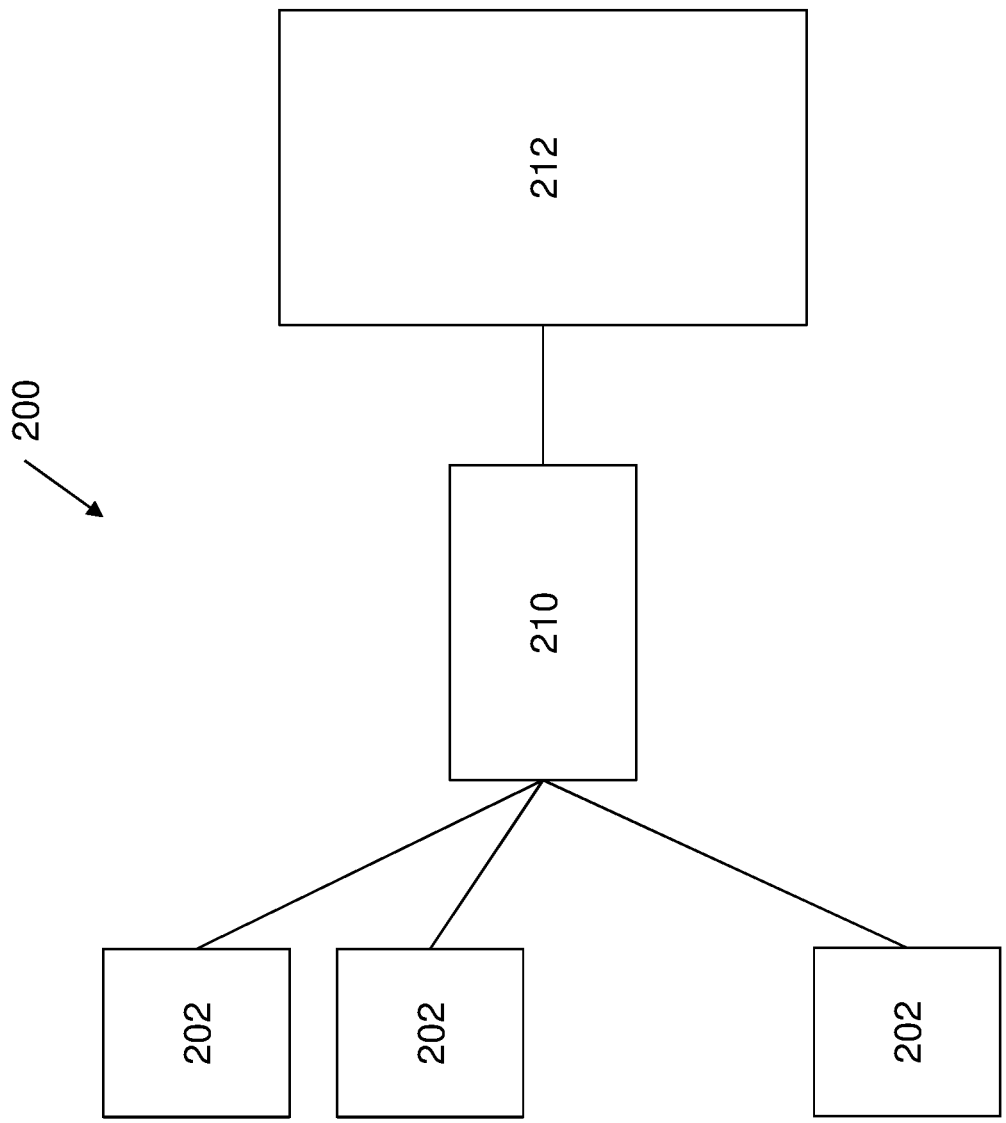
FIG. 2 is a block diagram of a system for heating, ventilation and air-conditioning (HVAC) systems setup in accordance with an embodiment of the present disclosure.

FIG. 2 depicts a block diagram of a system for HVAC equipment setup according to one or more embodiments. The system 200 includes thermostats 202, a user device 210, and a server 212. In one or more embodiments, thermostats 202 can control an HVAC system. The thermostats 202 can include a microcontroller that can utilize any type of hardware device such as the computing system 200 from FIG. 1. The thermostats 202 can communicate with the user device 210 through a wired or wireless connection including but not limited to Bluetooth®, near-field communication (NFC), WiFi, or the like.

In one or more embodiments, the system 200 can be utilized in a residential (or commercial) setting where an HVAC system has been installed in one of a number of homes within a subdivision. A builder of the homes can submit blueprints or other design drawings or plans that include the HVAC system information. HVAC system information includes a model of HVAC system, the different zones within the house for temperature control, and any other information related to the HVAC system model, configuration, and/or operations. An HVAC installer (or technician) can utilize a user device 210 such as, for example, a smart phone, a smart watch, a tablet computer, and the like. The user device 210 can have an application (app) installed that can communicate with the server 212 through a network connection. The network connection can be any type of network such as a cellular network or other wired or wireless networks. The app on the user device 210 can access the HVAC system information from the server 212 after receiving credentialing information from a user. Or, in one or more embodiments, the HVAC system information can be stored locally on the user device 210. Credentialing information can include a login and password submitted for a user to verify the user has authority to access the HVAC system information. Credentialing information can also include an identification number for the thermostats 202 and/or location information about the location of the user device 210. For example, a HVAC installer arrives at a house to set up the thermostat 202 for use with an HVAC system. The installer can either enter an address or a global positioning system (GPS) application on the user device can verify the location of the installer. The installer can login to the app on his or her user device 210. The login, password, and location can be transmitted to the server 212 utilizing a network connection. After verification of the login and location (or a thermostat identification number), the server 212 can transmit HVAC system information for the particular system located at the location of the installer to the user device 210. Once the HVAC system information is received by the user device 210, the installer can connect to the thermostat 202 controlling the HVAC system. The user device 210 transmits the HVAC system information to the thermostat 202 to setup and test the thermostat 202. The HVAC system information includes setup instructions and test instructions based on the HVAC model. The setup instructions can be executed on the thermostat 202 to assign different zones within a house or other programming for the thermostat 202. The test instructions can verify the thermostat 202 is operating within normal parameters. Upon completion of the thermostat 202 setup and testing, the thermostat 202 can send an indication to the user device 210 to verify (or confirm) the setup and testing. The user device 210 can generate a report that includes the confirmation of the setup and other data (time, location, etc.) and send this report to the server 212.

The setup can be precisely configured to be optimal for a specific model of home especially when there is HVAC equipment that can operate in customizable modes, like variable speed equipment. The metrics of the system can then be recorded using wired or wireless sensors and fed back to the server to validate if the installation meets the required standards for that specific home design and weather conditions. If the setup is faulty or unsuccessful the server can use prior analysis or intelligence to either suggest additional testing to troubleshoot the issue or make suggestions to alleviate the issue and run another test. If all troubleshooting or enhancements do not seem to result in a successful installation the server can escalate the issue to a human expert who can look at all the details and try to work with the on-site technician to fix the issue in the home.

In one or more embodiments, the app on the user device 210 can generate messages that can be sent to a group of users on a communication platform when a setup and test for an HVAC system is completed.

Figure 3:
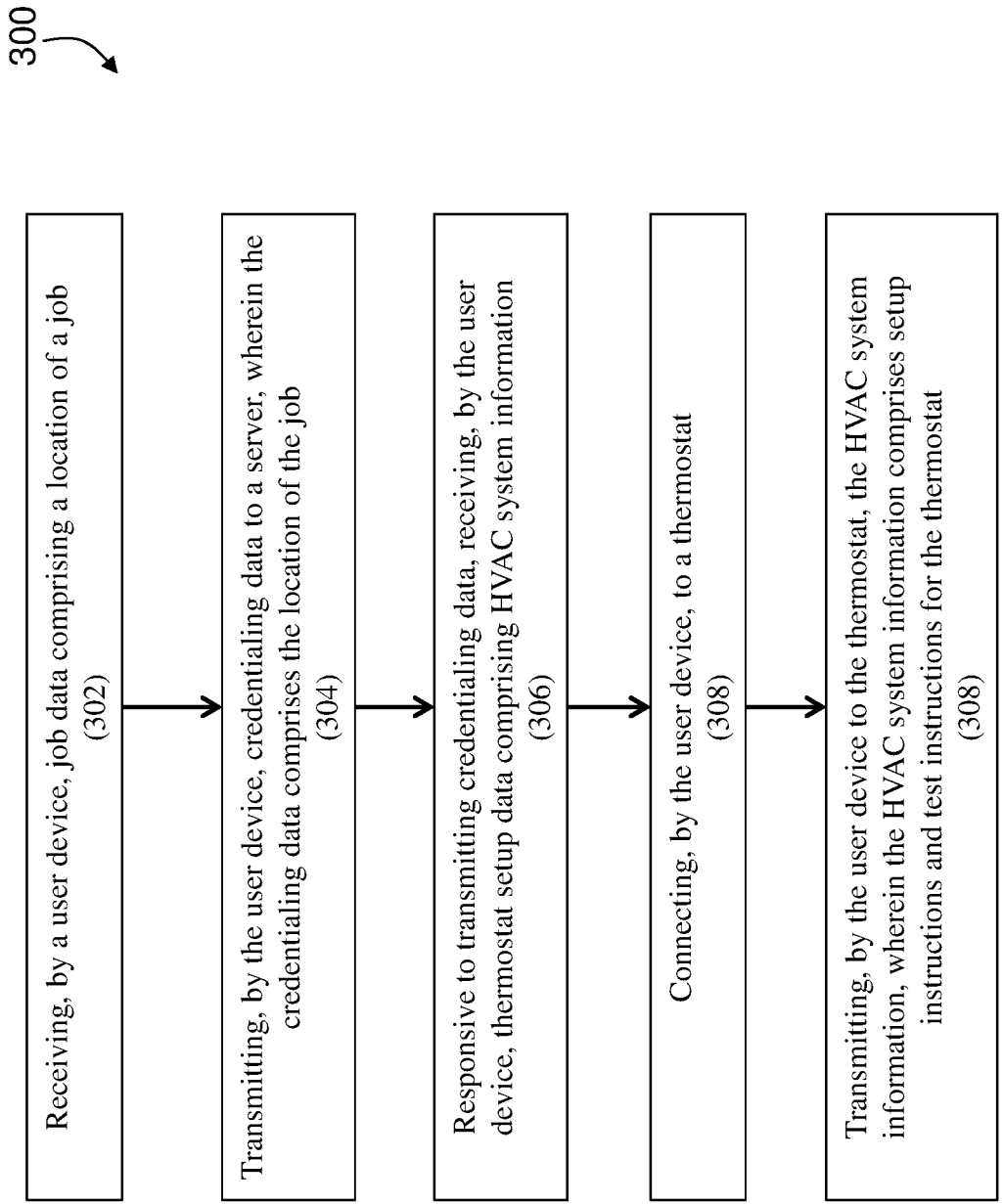
FIG. 3 is a flow diagram of a method for interfacing with thermostats for heating, ventilation and air-conditioning (HVAC) systems in accordance with an embodiment of the present disclosure.

FIG. 3 depicts a block diagram of a method for interfacing with thermostats for heating, ventilation and air-conditioning (HVAC) systems according to one or more embodiments of the present disclosure. The method 300 includes receiving, by a user device, job data comprising a location of a job, as shown in block 302. At block 304, the method 300 includes transmitting, by the user device, credentialing data to a server, wherein the credentialing data comprises the location of the job. The method 300, at block 306, includes responsive to transmitting credentialing data, receiving, by the user device, thermostat setup data comprising HVAC system information. The method 300 also includes connecting, by the user device, to a thermostat, as shown at block 308. And at block 310, the method 300 includes transmitting, by the user device to the thermostat, the HVAC system information, wherein the HVAC system information comprises setup instructions and test instructions for the thermostat.

Additional processes may also be included. It should be understood that the processes depicted in FIG. 3 represent illustrations, and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for interfacing with thermostats for heating, ventilation and air-conditioning (HVAC) systems, the method comprising:
   receiving, by a user device, job data comprising a location of a job, wherein the user device comprises at least one of a smart phone, a smart watch and a tablet computer;
   transmitting, by the user device, credentialing data to a server, wherein the credentialing data comprises a location of the user device;
   responsive to the transmitting the credentialing data, receiving, by the user device from the server, thermostat setup data comprising HVAC system information;
   connecting, by the user device, to a thermostat; and
   transmitting, by the user device to the thermostat, the HVAC system information;
   wherein the HVAC system information comprises setup instructions for installation of the thermostat in the HVAC system.

2. The computer-implemented method of claim 1 further comprising: receiving, by the user device from the thermostat, an indication, wherein the indication comprises a confirmation of a setup of the thermostat.

3. The computer-implemented method of claim 1, wherein the HVAC system information further comprises at least one of test instructions for the thermostat, and HVAC model data.

4. The computer-implemented method of claim 1, wherein the credentialing data further comprises an input from a user.

5. The computer-implemented method of claim 4, wherein the input from the user comprises a login and password for the user of the user device.

6. The computer-implemented method of claim 1 further comprising:
   generating a report, by the user device, responsive to receiving a confirmation from the thermostat; and
   transmitting the report to the server.

7. The computer-implemented method of claim 3 further comprising:
   verifying, by the user device, the setup instructions were executed on the thermostat; and
   transmitting a confirmation to the server based at least in part on the setup instruction being executed.

8. The computer-implemented method of claim 1, wherein the credentialing data further comprises thermostat identification data.

9. A heating, ventilation and air-conditioning (HVAC) system comprising:
   a thermostat;
   a user device in communication with the thermostat, wherein the user device comprises at least one of a smart phone, a smart watch and a tablet computer, wherein the user device is configured to:
   receive job data comprising a location of a job;
   transmit credentialing data to a server, wherein the credentialing data comprises a location of the user device;
   receive, from the server, thermostat setup data comprising HVAC system information in response to the transmitting of the credentialing data; and
   transmit, to the thermostat, the HVAC system information;
   wherein the HVAC system information comprises setup instructions for installation of the thermostat in the HVAC system.

10. The system of claim 9 wherein the thermostat is further configured to transmit an indication to the user device, wherein the indication comprises a confirmation of a setup of the thermostat.

11. The system of claim 9, wherein the HVAC system information further comprises at least one of test instructions for the thermostat, and HVAC model data.

12. The system of claim 9, wherein the credentialing data further comprises an input from a user.

13. The system of claim 12, wherein the input from the user comprises a login and password for the user of the user device.

14. The system of claim 9, wherein the thermostat is further configured to:
   generate a report responsive to receiving a confirmation from the thermostat; and
   transmit the report to at least one of the user device and the server.

15. The system of claim 9 wherein the user device is a mobile device.

* * * * *